(12) United States Patent
Williamson et al.

(10) Patent No.: US 8,300,915 B2
(45) Date of Patent: Oct. 30, 2012

(54) METHODS OF OPERATING AN IMAGE-BASED SELF-SERVICE CHECK DEPOSITING TERMINAL TO IMPROVE LOCATING A PRE-DEFINED CHECK FIELD AND AN APPARATUS THEREFOR

(75) Inventors: Steven D. Williamson, Waterloo (CA); Stewart B. Kelland, Waterloo (CA)

(73) Assignee: NCR Corporation, Duluth, GA (US)

( * ) Notice: Subject to any disclaimer, the term of this patent is extended or adjusted under 35 U.S.C. 154(b) by 764 days.

(21) Appl. No.: 12/469,756

(22) Filed: May 21, 2009

(65) Prior Publication Data

US 2010/0296719 A1  Nov. 25, 2010

(51) Int. Cl.
*G06K 9/00* (2006.01)
(52) U.S. Cl. ......................................... 382/137
(58) Field of Classification Search .................. 382/100, 382/135–140; 194/4–6; 209/534–536; 235/379–381; 250/200–203; 356/71–74; 902/7–10; 705/45–48
See application file for complete search history.

(56) References Cited

U.S. PATENT DOCUMENTS

| | | | |
|---|---|---|---|
| 2002/0104782 A1* | 8/2002 | DeWitt et al. | 209/3.3 |
| 2010/0258629 A1* | 10/2010 | Huang | 235/449 |

* cited by examiner

*Primary Examiner* — Atiba O Fitzpatrick
(74) *Attorney, Agent, or Firm* — Michael Chan

(57) ABSTRACT

A method is provided of operating an image-based self-service check depositing terminal. The method comprises receiving from a self-service depositor a check to be deposited, illuminating the check with infrared radiation to improve contrast between pre-printed characters on the check and non-pre-printed check data on the check, and electronically on an imager capturing an image of the check while the check is illuminated with infrared radiation to provide a captured infrared check image with improved contrast between at least one pre-printed character on the check and non-pre-printed check data on the check so as to allow location of a check field associated with the check to be more easily located.

3 Claims, 7 Drawing Sheets

METHODS OF OPERATING AN IMAGE-BASED SELF-SERVICE CHECK DEPOSITING TERMINAL TO IMPROVE LOCATING A PRE-DEFINED CHECK FIELD AND AN APPARATUS THEREFOR

BACKGROUND

The present invention relates to depositing of checks, and is particularly directed to methods of operating an image-based self-service check depositing terminal, such as an image-based check depositing automated teller machine (ATM), to improve locating a pre-defined check field and an apparatus therefor.

In a typical image-based check depositing ATM, an ATM customer is allowed to deposit a check (without having to place the check in any deposit envelope) in a publicly accessible, unattended environment. To deposit a check, the ATM customer inserts a user identification card through a user card slot at the ATM, enters the amount of the check being deposited, and inserts the check to be deposited through a check slot of a check acceptor. A check transport mechanism receives the inserted check and transports the check in a forward direction along a check transport path to a number of locations within the ATM to process the check.

If the check is not accepted for deposit, the check transport mechanism transports the check in a reverse direction along the check transport path to return the check to the ATM customer via the check slot. If the check is accepted for deposit, the amount of the check is deposited into the ATM customer's account and the check is transported to a storage bin within the ATM. An endorser printer prints an endorsement onto the check as the check is being transported to and stored in the storage bin. Checks in the storage bin within the ATM are periodically picked up and physically transported via courier to a back office facility of a financial institution for further processing.

An imager is one location within the image-based check depositing ATM at which the check is processed. The imager usually includes a front imaging camera and a rear imaging camera. The front imaging camera captures a front-side image of the check, and the rear imaging camera captures a rear-side image of the check. A reader is another location within the image-based check depositing ATM at which the check is processed. The reader may comprise an optical character recognition (OCR) reader which reads check contained in a number of pre-defined check fields from the front-side check image.

Since most checks today have scenic background printing, it is often times difficult for the OCR reader to recognize check data contained in the pre-defined check fields. This is because the scenic background printing usually blends in with check data which has been either handwritten or typed into the pre-defined check fields. Moreover, handwritten signatures often make it difficult to achieve acceptable read rates using OCR techniques. It would be desirable to provide methods of operating the image-based check depositing ATM such that check deposit acceptance rates at the ATM are improved.

SUMMARY

In accordance with one embodiment of the present invention, a method of operating an image-based self-service check depositing terminal comprises receiving from a self-service depositor a check to be deposited, illuminating the check with infrared radiation to improve contrast between pre-printed characters on the check and non-pre-printed check data on the check, and electronically on an imager capturing an image of the check while the check is illuminated with infrared radiation to provide a captured infrared check image with improved contrast between at least one pre-printed character on the check and non-pre-printed check data on the check so as to allow location of a check field associated with the check to be more easily located.

DETAILED DESCRIPTION

Figure 1:
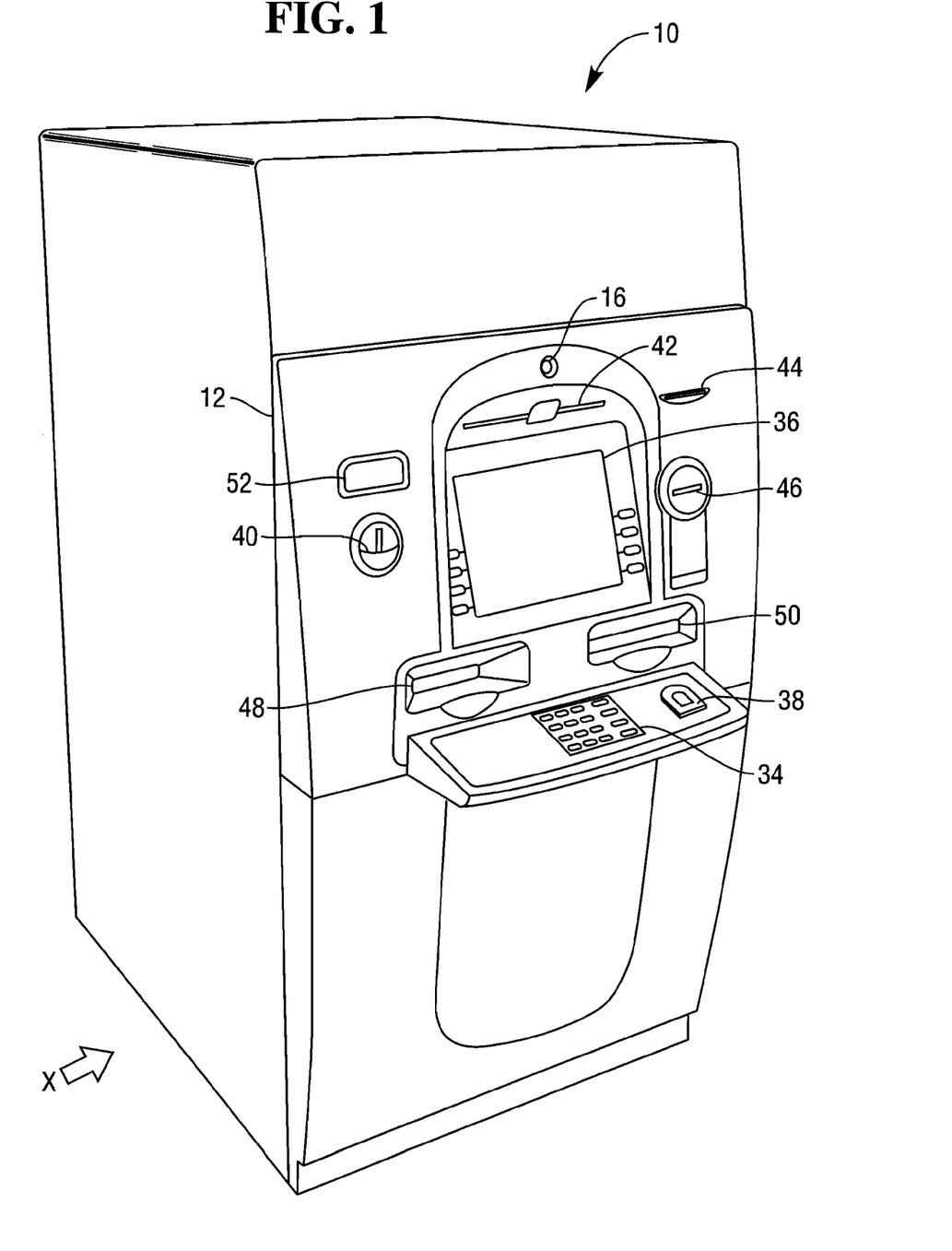
FIG. 1 is a left-front perspective view of an image-based check depositing automated teller machine (ATM) constructed in accordance with one embodiment of the present invention.

Referring to FIG. 1, a self-service check depositing terminal in the form of an image-based check depositing automated teller machine (ATM) 10 is illustrated. The check depositing ATM 10 comprises a fascia 12 coupled to a chassis (not shown). The fascia 12 defines an aperture 16 through which a camera (not shown) images a customer of the ATM 10. The fascia 12 also defines a number of slots for receiving and dispensing media items, and a tray 40 into which coins can be dispensed. The slots include a statement output slot 42, a receipt slot 44, a card reader slot 46, a cash slot 48, another cash slot 50, and a check input/output slot 52. The slots 42 to 52 and tray 40 are arranged such that the slots and tray align with corresponding ATM modules mounted within the chassis of the ATM 10.

The fascia 12 provides a user interface for allowing an ATM customer to execute a transaction. The fascia 12 includes an encrypting keyboard 34 for allowing an ATM customer to enter transaction details. A display 36 is provided for presenting screens to an ATM customer. A fingerprint reader 38 is provided for reading a fingerprint of an ATM customer to identify the ATM customer. The user interface features described above are all provided on an NCR PERSONAS (trademark) 6676 ATM, available from NCR Financial Solutions Group Limited, Discovery Centre, 3 Fulton Road, Dundee, DD2 4SW, Scotland.

Figure 2:
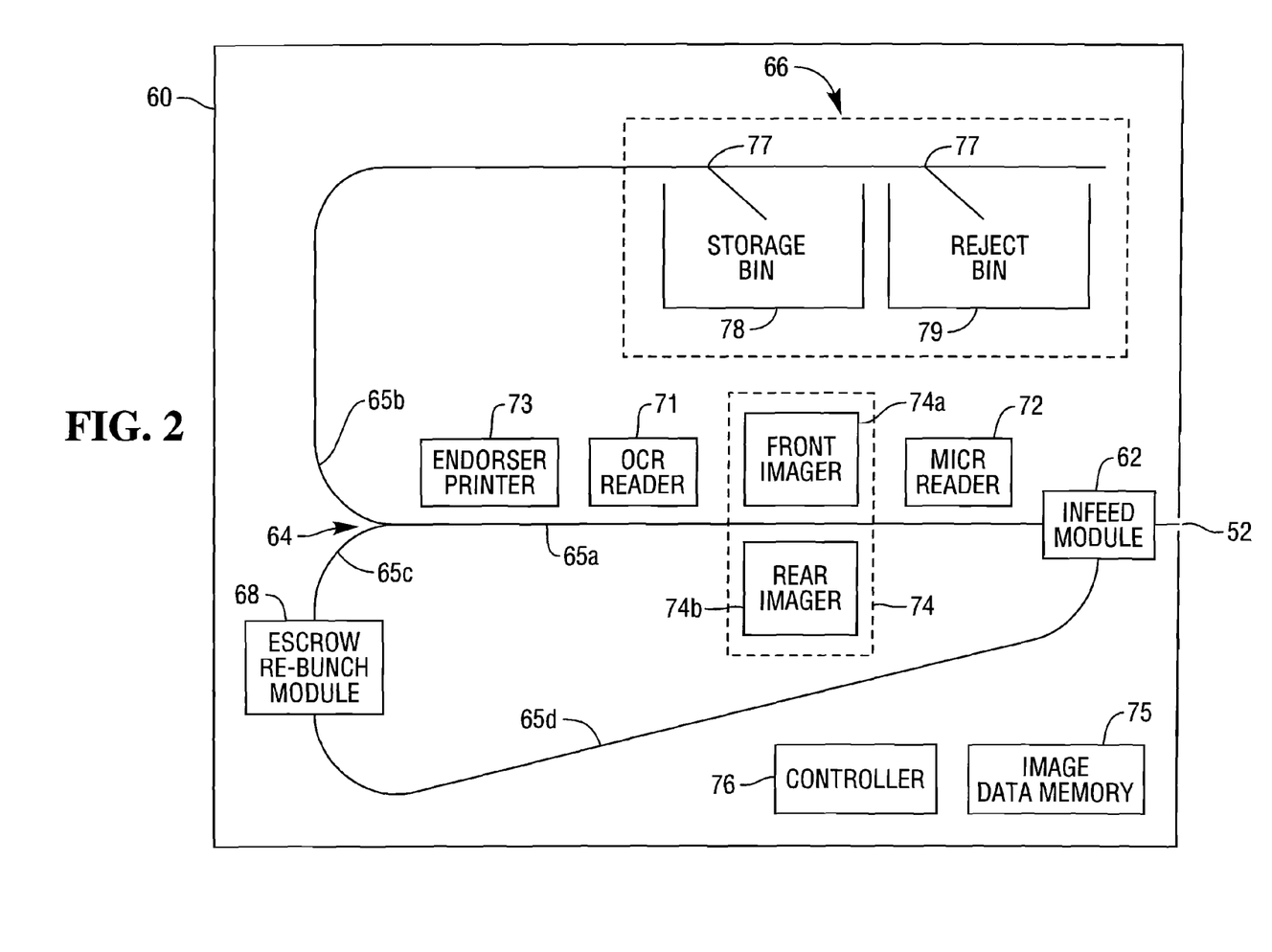
FIG. 2 is a simplified schematic diagram, looking approximately in the direction of arrow X in FIG. 1, of a check processing module of the ATM of FIG. 1.

A check processing module (CPM) 60 will now be described with reference to FIG. 2. FIG. 2 is a simplified schematic diagram (looking approximately in the direction of arrow X in FIG. 1) of part of the fascia 12 and main parts of the CPM 60. The CPM 60 is a modified version of a conventional check processing module, such as a check processing module which can be used in the PERSONAS (trademark) 6676 NCR ATM.

The CPM 60 comprises four main units which includes an infeed module 62, a transport module 64, a pocket module 66, and an escrow re-bunch module (ERBM) 68. The infeed module 62 receives a check which has been deposited into the check input/output slot 52, and transports the check to an inlet of the transport module 64. The dimensions of the infeed module 62, such as its run length, may vary depending upon the particular model ATM the CPM 60 is installed. The structure and operation of the infeed module 62 are conventional and well known and, therefore, will not be described.

The transport module 64 includes a check input/output transport mechanism which receives a check from the inlet adjacent to the infeed module 62, and transports the check along a main document track portion 65a. The transport module 64 includes a diverter mechanism which is operable to divert the check along either a first document track portion 65b to the pocket module 66 or a second document track portion 65c to the ERBM 68. A return document track portion 65d interconnects the ERBM 68 and the infeed module 62 to allow a bunch of checks which has accumulated in the ERBM 68 to be transported back to the infeed module 62.

Figure 3:
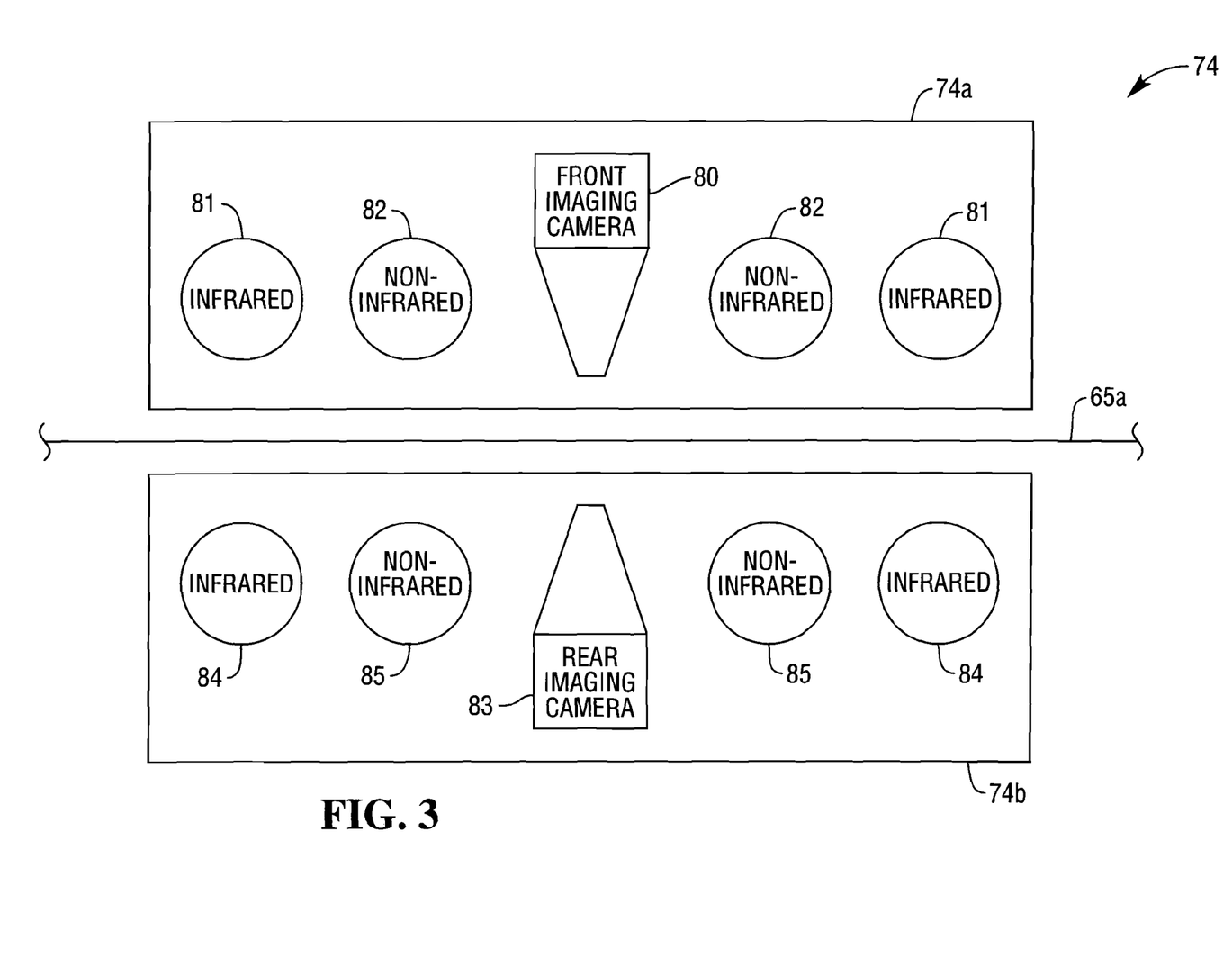
FIG. 3 is a detailed schematic view of a portion (an imager) of FIG. 2.

The transport module 64 further includes a magnetic ink character recognition (MICR) head 72 for reading magnetic details on a code line of a check. The transport module 64 also includes an imager 74 including a front imager 74a and a rear imager 74b for capturing an image of each side of a check (front and rear). As shown in more detail in FIG. 3, the front imager 74a includes a front imaging camera 80, an infrared radiation source 81 and a non-infrared light radiation source 82. Similarly, the rear imager 74b includes a rear imaging camera 83, an infrared radiation source 85 and a non-infrared light radiation source 86. Each of the non-infrared light radiation sources 82, 85 may comprise a combination of a number of red light emitting diodes (LEDs), a number of green LEDs, and a number of blue LEDs.

Referring again to FIG. 2, an optical character recognition (OCR) reader 71 is provided for optically reading characters from check images lifted by the imager 74. Although the OCR reader 71 shown in FIG. 2 is in the form of hardware, it is conceivable that OCR functionality may be provided in the form of software. Accordingly, the OCR functionality described herein may be in the form of either hardware or software. An endorser printer 73 is provided for printing endorsements onto checks. An image data memory 75 is provided for storing images of checks. A controller 76 is provided for controlling the operation of the elements within the CPM 60.

The pocket module 66 includes a storage bin 78 for storing processed checks. The pocket module 66 further includes a reject bin 79 for storing rejected checks. A divert gate 77 is provided for diverting checks to either the storage bin 78 or the reject bin 79. The structure and operation of the pocket module 66 are conventional and well known and, therefore, will not be described.

The CPM 60 may be of a type which processes a bunch of checks or only one check at a time. This type of processing is sometimes referred to as "multiple-check processing". If the CPM 60 is of the type which can process a bunch of checks, then an escrow module (such as the ERBM 68 shown in FIG. 2) is needed. The ERBM 68 is manufactured and available from Glory Products, located in Himeji, Japan. The ERBM 68 allows a bunch of checks (i.e., more than one check) to be processed in a single transaction. If a bunch of checks has accumulated in the ERBM 68 and is unable to be processed further within the CPM 60, then the bunch of checks is transported via the return document track portion 65d back to the infeed module 62 to return the bunch of checks to the ATM customer.

However, if the CPM 60 is of the type which can process only a single check, then the ERBM 68 is not needed. Once a check is received for processing, the check must be deposited into a bin (i.e., either the storage bin 78 or the reject bin 79) before another check can be received for processing. This type of processing is sometimes referred to as "single-check processing". For simplicity, the following description will describe only a single check being processed, even though the CPM 60 shown in FIG. 2 includes an ERBM 68 which is capable of processing a bunch of checks.

Figure 4:
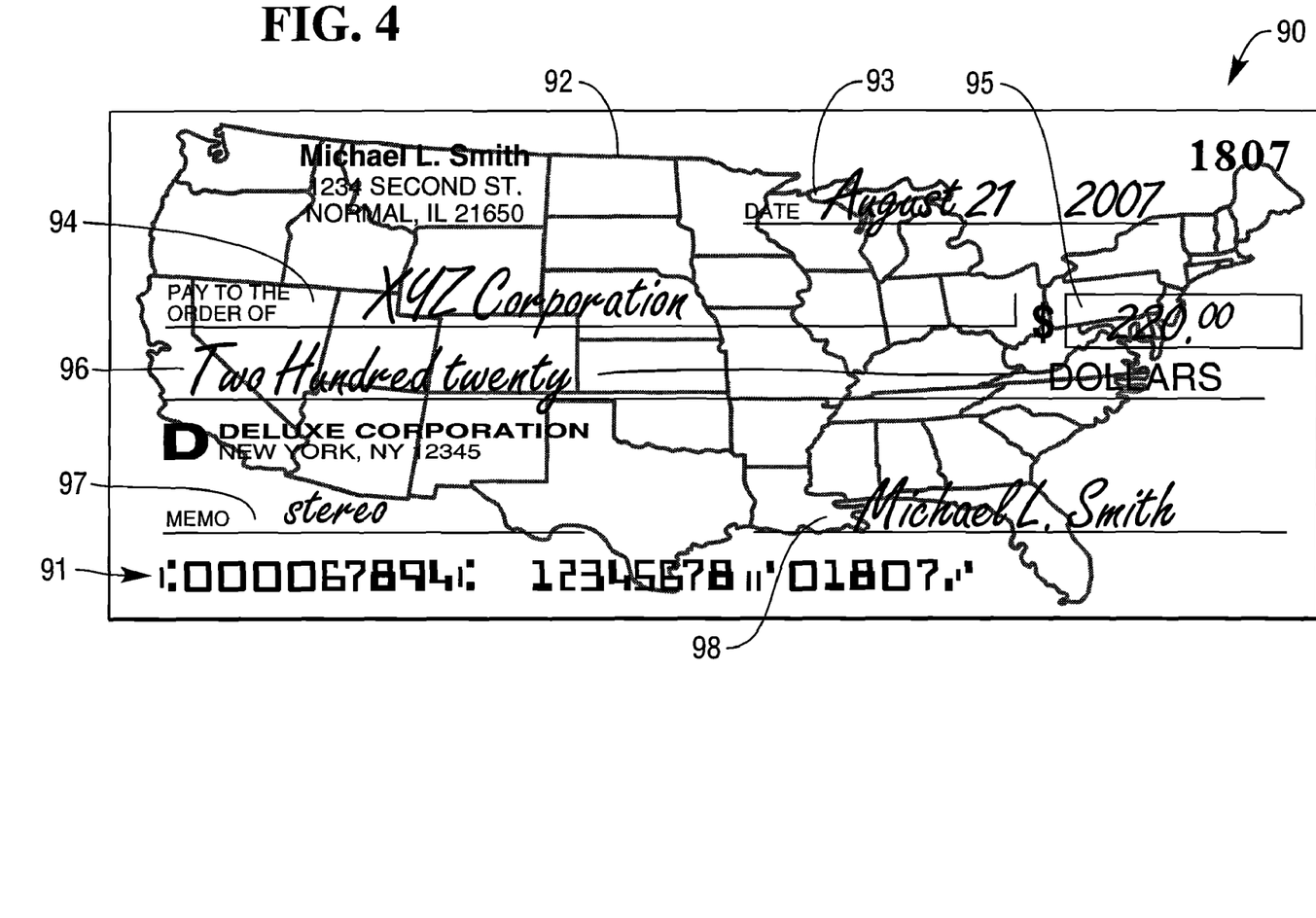
FIG. 4 is a view of an original check received from an ATM customer at the ATM of FIG. 1.

Referring to FIG. 4, an example of an original physical check to be deposited by the ATM customer is shown, and is designated with reference numeral "90". The check 90 includes a MICR codeline 91 which is pre-printed using magnetic ink. The check 90 also has pre-printed background in the form of a map outline 92 of the continental United States.

The check 90 further includes a number of pre-defined check fields to be filled in by a check payor. As examples, pre-defined check fields shown in the check 90 of FIG. 4 include a date field 93, a payee name field 94, a courtesy amount field 95, a legal amount field 96, a memo field 97, and a payor signature field 98. Each pre-defined check field contains either handwritten or typed-in check data provided by the check payor (who is "Michael L. Smith" in this example check). Typically, the date field 93 contains a handwritten date, the payee name field contains a handwritten payee name, the courtesy amount field 95 contains an amount (in numeric form) of the check, the legal amount field 96 contains an amount (in alphabetic form) of the check, the memo field 97 contains handwritten text provided by the check payor, and the payor signature field 98 contains signature of the check payor.

A particular pre-printed field indicator usually identifies location of each pre-defined check field shown in the check 90 of FIG. 4. Pre-printed field indicators usually comprise pre-printed characters such as pre-printed text and pre-printed symbols. For example, the text "DATE" usually appears at the beginning of the date field 93, and the text "PAY TO THE ORDER OF" usually appears at the beginning of the payee name field 94. The symbol "$" usually appears at the beginning of the courtesy amount field 95, and the text "DOLLARS" usually appears at the end of the legal amount field 96. The text "MEMO" usually appears at the beginning of the memo field 97. Also, the memo field 97 is usually adjacent the beginning of the pre-printed MICR codeline 91, and the payor signature field 98 is usually adjacent the end of the pre-printed MICR codeline. Various pre-printed field indicators which identify locations of pre-defined check fields of a check are known and, therefore, will not be described further.

Figure 5A:
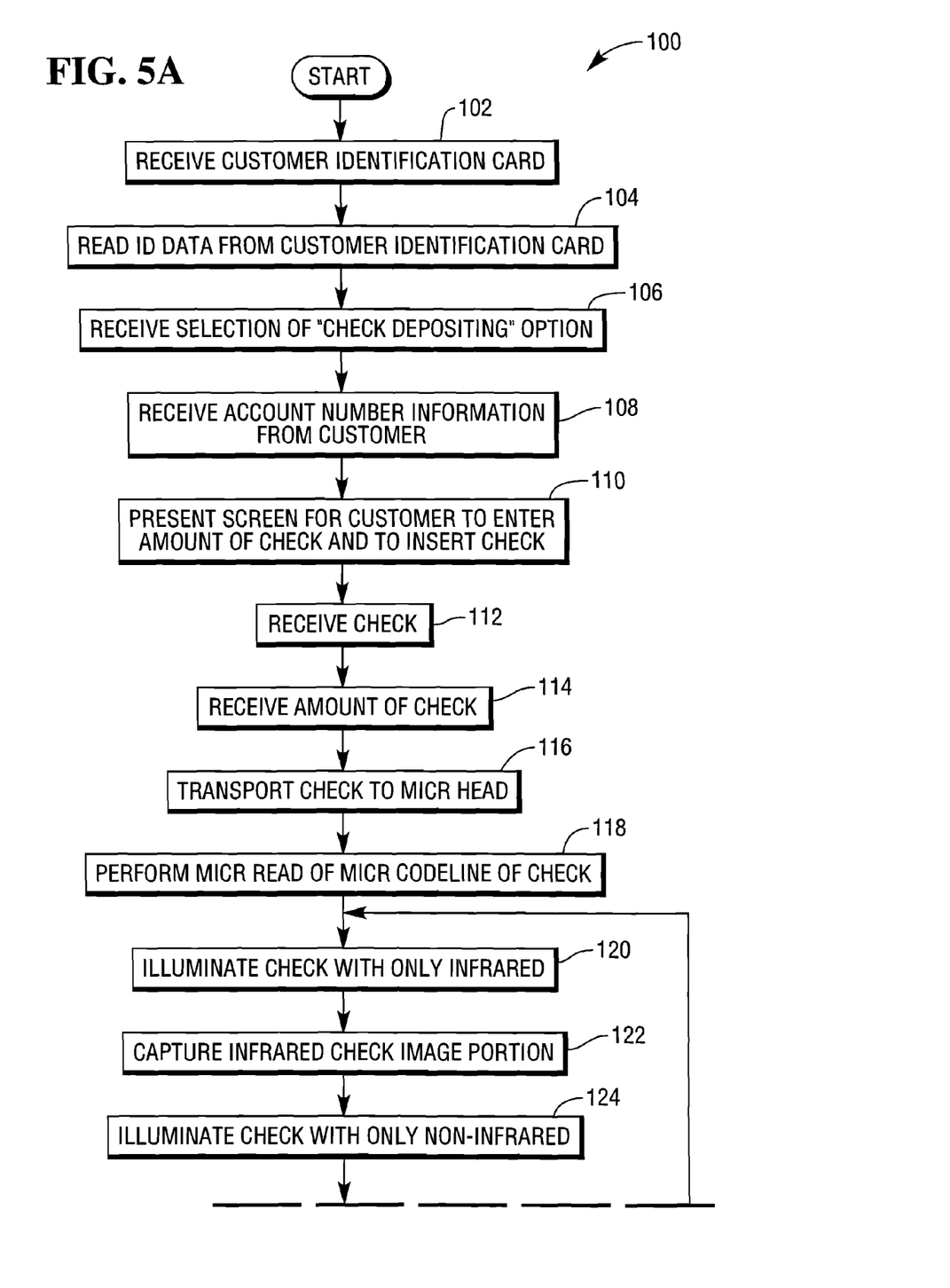
FIG. 5 is a flowchart illustrating steps involved in a check depositing operation in accordance with one embodiment of the present invention.
Figure 5B:
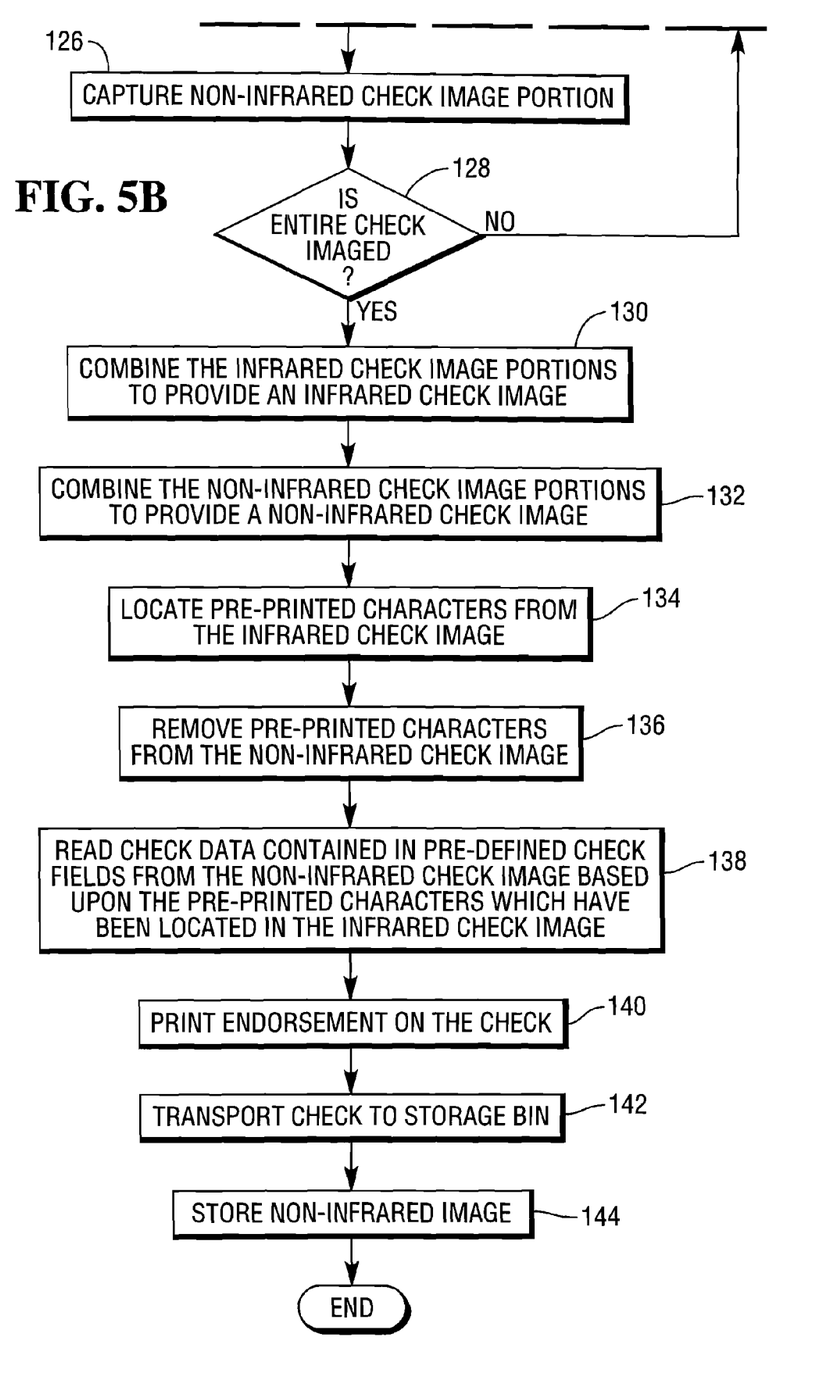

Referring to FIG. 5, a flowchart 100 illustrates steps involved in a check depositing transaction in accordance with one embodiment of the present invention. In the check depositing transaction, the ATM customer inserts a customer identification card into the card reader slot 46 and enters identifying data, like a personal identification number (PIN) to start the transaction (steps 102 and 104). The ATM customer is presented with a screen on the display 36 to select a transaction from a list of transaction options, and selects the "check depositing" option (step 106). The ATM customer also selects an account into which the deposit is to be made (step 108).

The ATM customer is then presented with a screen to enter the amount of the check 90 via the keyboard 34, and to insert the check to be deposited through the check input/output slot 52 (step 110). The ATM customer inserts the check 90 (step 112), and enters the amount of the check (step 114). The controller 76 receives the amount of the check 90. The infeed module 62 receives the check 90 and transports the check to the inlet of the transport module 64. The transport mechanism of the transport module 64 receives the check 90 and transports the check (step 116) to the MICR head 72 where the MICR codeline on the check is read (step 118).

The transport mechanism of the transport module 64 then transports the check 90 to the imager 74, where both sides of the check are imaged. For simplicity, imaging of only the front of the check 90 will be described in the remainder of the flowchart 100. More specifically, the check 90 is illuminated with only infrared radiation from the infrared radiation source 81 when the check is transported to the imager 74 (step 120). An infrared check image portion is captured as the check 90 is illuminated with only the infrared radiation (step 122). The check 90 is then illuminated with only the non-infrared radiation from the non-infrared radiation source 82 (step 124). A non-infrared check image portion is captured as the check 90 is illuminated with only the non-infrared radiation (step 126).

A determination is then made in step 128 as to whether the entire check has been imaged. If the determination in step 128 is negative (i.e., the entire check has not yet been imaged), then the process returns back to step 120 and repeats capturing additional check image portions of the check in the manner just described hereinabove until the entire check has been imaged. If the determination in step 128 is affirmative (i.e., the entire check has been imaged), then the process continues to step 130.

Figure 6:
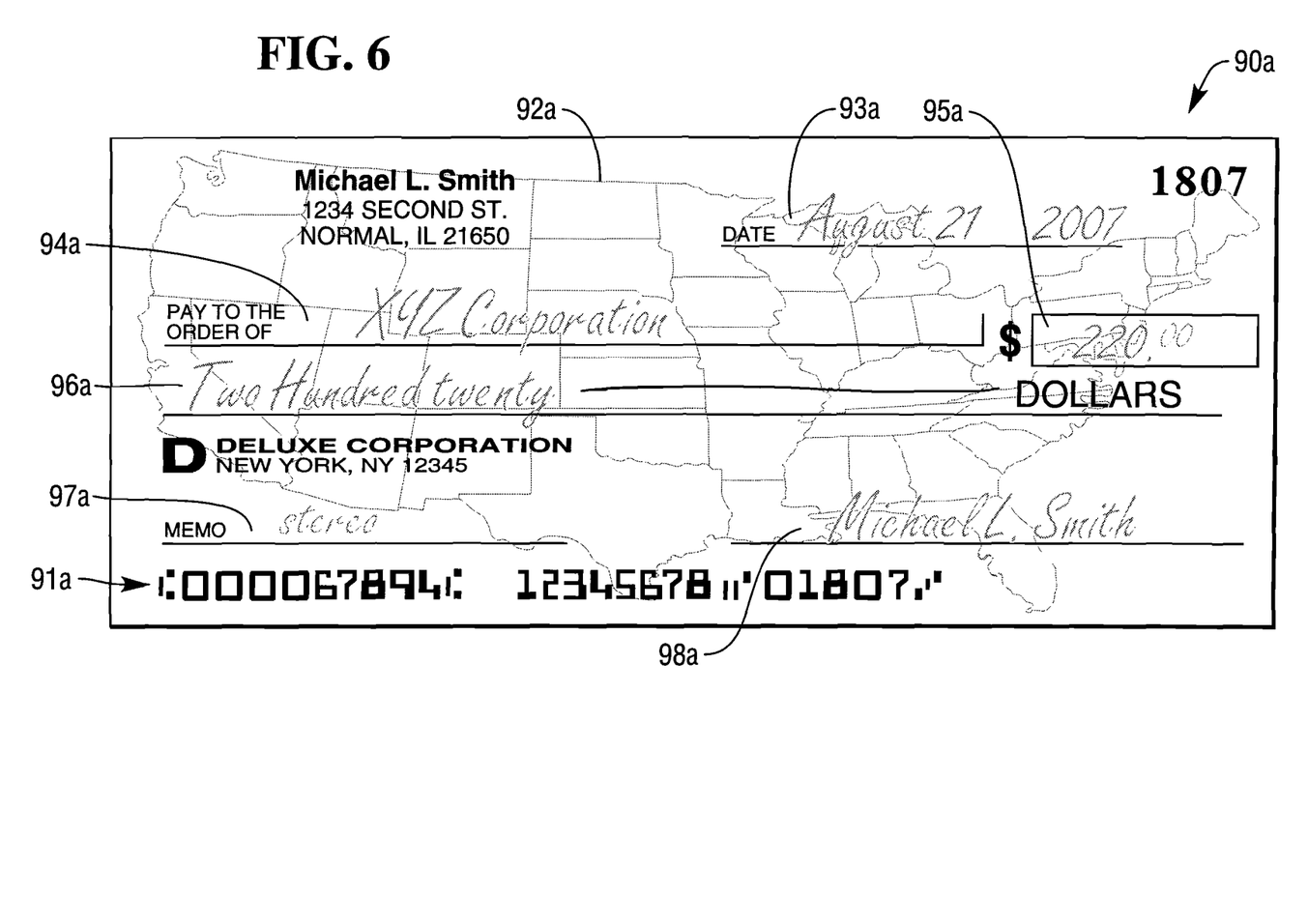
FIG. 6 is a view of a captured infrared image of the original check of FIG. 4.

After all check image portions are captured, corresponding check images are formed. More specifically, all of the infrared check image portions captured back in step 122 are combined to provide an infrared check image 90a such as shown in FIG. 6 (step 130). All of the non-infrared check image portions captured back in step 126 are combined to provide a non-infrared check image (step 132) which is not shown. The non-infrared check image may be any type which is non-infrared. For example, the non-infrared check image may comprise a binary check image. As another example, the non-infrared check image may comprise a grayscale check image. Still as another example, the non-infrared check image may comprise a color check image.

It should be apparent from the above description that the infrared and non-infrared check image portions are captured in parallel using a multiplexing scheme. Accordingly, the infrared and non-infrared check image portions are interleaved and are all captured during one pass of the check 90 in front of the imager 74. It should also be apparent that each of the infrared and non-infrared check images is formed from its corresponding check image portions which have been captured during the one pass of the check 90 in front of the imager 74.

The captured infrared check image 90a (FIG. 6) is analyzed to locate a number of pre-printed check fields (step 134). For example, the infrared check image 90a may be analyzed to locate the pre-printed text "PAY TO THE ORDER OF", and thereby to locate the payee name field 96a. As another example, the infrared check image 90a may be analyzed to locate the pre-printed symbol "$", and thereby to locate the courtesy amount field 95a. Still as another example, the infrared check image 90a may be analyzed to locate the pre-printed text "DOLLARS", and thereby to locate the legal amount field 96a.

Referring to FIGS. 4 and 6, it should be noted that the map outline 91a in the infrared check image 90a of FIG. 6 is faint as compared to the map outline 91 in the check of FIG. 4. Also, the handwritten information contained in the various pre-defined fields 93a, 94a, 95a, 96a, 97a, 98a in the infrared check image 90a of FIG. 6 is faint as compared to the check of FIG. 4. However, the various pre-printed characters (i.e., text and symbols) in the infrared check image 90a of FIG. 6 appear just as sharp as the pre-printed characters in the check of FIG. 4. As an example, the "$" symbol in the infrared check image 90a of FIG. 6 appears just as sharp as the "$" in the check of FIG. 4.

It should also be noted that all printing that is not carbon black (such as background printing and handwriting shown on the original check 90 of FIG. 4) on checks are "removed" to provide improved contrast between pre-printed characters on the check and non-pre-printed check data on the check when infrared radiation illuminates the check. Since inks used in the printing of pre-printed characters on the check 90 contain high levels of carbon black, the various pre-printed characters remain when the check is illuminated by infrared radiation and the infrared check image 90 shown in FIG. 6 is lifted. The remaining pre-printed characters enable locations of pre-defined check fields in the infrared check image 90a of FIG. 6 to be more easily located. Thus, the use of the infrared check image 90a (FIG. 6) enables location of a check field associated with the check 90 (FIG. 1) to be more easily located.

The captured non-infrared check image (not shown) is then processed to "remove" pre-printed characters which have been located using the infrared check image 90a (step 136). It should be noted that this step (i.e., step 136) is optional. Also, it should be noted that while the physical check 90 shown in FIG. 4 is not a check image, it is a fair representation of what the lifted non-infrared check image would look like when the non-infrared radiation source 82 (i.e., the source contains no infrared radiation) was used to illuminate the check to lift the non-infrared check image. The OCR reader 71 (FIG. 2) then performs an OCR read of check data contained in various pre-defined check fields from the processed non-infrared check image in which pre-printed text and symbols have been removed (step 138).

The endorser printer 73 then prints endorsement data onto the physical check 90 of FIG. 4 (step 140). The endorsed check is then transported along the document track portion 65a to the storage bin 78 of the pocket module 66 (step 142) for subsequent collection and further processing. The non-infrared check image is stored in the image data memory 75 (step 144). The non-infrared check image may be stored locally to the ATM 10. For example, the non-infrared check image may be stored on an ATM hard drive located within the ATM 10 for a period of time determined by the financial institution. The process then terminates.

It should be apparent that OCR read rates (as performed in step 138 of the flowchart 100 of FIG. 5) for reading check data contained in pre-defined check fields are improved. OCR read rates are improved not only because locations of pre-defined check fields are more easily located using the infrared check image 90a of FIG. 6, but also because check data contained in these pre-defined check fields are more easily read from the non-infrared check image when pre-printed text and symbols are removed from the non-infrared check image.

Although the above description describes the PERSONAS (trademark) 6676 NCR ATM embodying the present invention, it is conceivable that other models of ATMs, other types of ATMs, or other types of self-service check depositing terminals may embody the present invention. Self-service depositing terminals are generally public-access devices that are designed to allow a user to conduct a check deposit transaction in an unassisted manner and/or in an unattended environment. Self-service check depositing terminals typically include some form of tamper resistance so that they are inherently resilient.

Further, although the above description describes the character reading device as an OCR type of reader, it is conceivable that another type of character reading device may be used. Also, although the above description describes the amount of each check being entered by the check depositor, it is conceivable that software which is capable of automatically reading the amount of each check be provided to accomplish this function.

The particular arrangements disclosed are meant to be illustrative only and not limiting as to the scope of the invention. From the above description, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A method of operating an image-based check depositing automated teller machine (ATM), the method comprising:
   receiving from an ATM customer a check to be deposited;
   illuminating the check with non-infrared radiation;
   electronically on an imager capturing an image of the check while the check is illuminated with non-infrared radiation to provide a captured non-infrared check image;
   illuminating the check with infrared radiation to improve contrast between pre-printed characters on the check and non-pre-printed check data on the check;
   capturing an image of the check while the check is illuminated with infrared radiation to provide a captured infrared check image with improved contrast between at least one pre-printed character on the check and non-pre-printed check data on the check so as to allow location of a check field to be more easily located;
   applying OCR techniques to read from the captured non-infrared check image check data contained in a check field which has been located using the captured infrared check image;
   accepting the check for deposit when check data is able to be read from the non-infrared check image; and
   rejecting the check for deposit when check data is unable to be read from the non-infrared check image.

2. An apparatus for use in an image-based self-service check depositing terminal, the apparatus comprising:
   a check acceptor for receiving from a self-service depositor a check to be deposited;
   a radiation emitting device including (i) an energizeable infrared radiation source, and (ii) an energizeable non-infrared radiation source;
   an image lift device for lifting an image of a check as the check passes by the image lift device;
   a character reader for reading check data from a captured check image; and
   a processor for (i) controlling the check acceptor to transport the check to the image lift device, (ii) controlling the radiation emitting device to energize the infrared radiation source after the check has been transported to the image lift device, (iii) when the infrared radiation source is energized, controlling the image lift device to provide a captured infrared check image which has improved contrast between at least one pre-printed character on the check and non-pre-printed check data on the check, (iii) when the non-infrared radiation source is energized, controlling the image lift device to provide a captured non-infrared check image, (iv) locating a check field using the captured infrared check image, (v) controlling the character reader to read from the captured non-infrared check image check data contained in the check field which has been located using the captured infrared check image, (vi) controlling the check acceptor to accept the check for deposit when the character reader is able to be read check data from the located check field in the non-infrared check image, and (vii) controlling the check acceptor to reject the check for deposit when the character reader is unable to read check data from the located check field in the non-infrared check image.

3. An apparatus according to claim 2, wherein the character reader comprises an optical character recognition (OCR) type of reader.

* * * * *